United States Patent
Peters

(10) Patent No.: US 7,274,685 B1
(45) Date of Patent: Sep. 25, 2007

(54) SYSTEM AND METHOD FOR RECORDING INCOMING CALLS ON DEMAND IN A TRANSACTION PROCESSING SYSTEM

(75) Inventor: Michael Peters, Downers Grove, IL (US)

(73) Assignee: Rockwell Electronic Commerce, Wood Dale, IL (US)

( * ) Notice: Subject to any disclaimer, the term of this patent is extended or adjusted under 35 U.S.C. 154(b) by 1075 days.

(21) Appl. No.: 10/306,544

(22) Filed: Nov. 27, 2002

(51) Int. Cl.
*H04L 12/66* (2006.01)
*H04L 12/28* (2006.01)
*H04L 12/56* (2006.01)

(52) U.S. Cl. ............. 370/352; 370/401; 704/235; 704/246; 379/265.09

(58) Field of Classification Search ............ None
See application file for complete search history.

(56) References Cited

U.S. PATENT DOCUMENTS

| | | | |
|---|---|---|---|
| 4,289,934 A * | 9/1981 | Pitroda et al. | 379/269 |
| 4,739,187 A * | 4/1988 | Nelson et al. | 307/118 |
| 5,127,004 A | 6/1992 | Lenihan et al. | |
| 5,140,611 A | 8/1992 | Jones et al. | |
| 5,214,688 A * | 5/1993 | Szlam et al. | 379/266.08 |
| 5,268,903 A | 12/1993 | Jones et al. | |
| 5,555,179 A | 9/1996 | Koyama et al. | |
| 5,765,033 A | 6/1998 | Miloslavsky | |
| 5,826,235 A * | 10/1998 | Harman | 704/500 |
| 5,923,746 A * | 7/1999 | Baker et al. | 379/265.02 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 5,999,965 A * | 12/1999 | Kelly | 709/202 |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,097,806 A | 8/2000 | Baker et al. | |
| 6,108,711 A | 8/2000 | Beck et al. | |
| 6,122,364 A * | 9/2000 | Petrunka et al. | 379/265.02 |
| 6,138,139 A | 10/2000 | Beck et al. | |
| 6,167,395 A | 12/2000 | Beck et al. | |

(Continued)

*Primary Examiner*—Edan Orgad
*Assistant Examiner*—Blanche Wong
(74) *Attorney, Agent, or Firm*—Welsh & Katz Ltd.

(57) ABSTRACT

A recording system for recording calls between callers and agents of a transaction processing system includes an Internet Protocol (IP) gateway, an interface configured to operatively couple the IP gateway to the transaction processing system, a communication network operatively coupled to the IP gateway, where the IP gateway is configured to convert a call received from the transaction processing system into IP protocol data, and provide the IP protocol data to the communication network. Also included is a memory storage system operatively coupled to the processor and configured to store the IP protocol data, a processor operatively coupled to the communication network and configured to receive the IP protocol data, and a switch controlled by the agent and settable between a record-on mode and record-off mode such that the recording system records the call if the switch is set to the record-on mode and does not record the call if the switch is set to the record-off mode. The recording system can also playback various recorded messages, and play music while a call is on hold.

33 Claims, 4 Drawing Sheets

U.S. PATENT DOCUMENTS

| | | |
|---|---|---|
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,289,373 B1 | 9/2001 | Dezonno |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,678,266 B1 * | 1/2004 | Hollatz et al. ............... 370/352 |
| 6,728,236 B2 * | 4/2004 | Potter et al. ................. 370/352 |
| 6,732,156 B2 | 5/2004 | Miloslavsky |
| 6,968,368 B2 * | 11/2005 | Eitel et al. .................. 709/219 |
| 7,076,048 B2 * | 7/2006 | Lee et al. ............... 379/265.01 |

* cited by examiner

SYSTEM AND METHOD FOR RECORDING INCOMING CALLS ON DEMAND IN A TRANSACTION PROCESSING SYSTEM

FIELD OF THE INVENTION

The present invention relates generally to a system and method for providing announcement and recording capability for incoming calls in a transaction processing system and/or an automatic call distribution system ("ACD").

BACKGROUND

Systems which automatically distribute customer contacts or calls (generically referred to as "ACD") are often employed in telemarketing environments in which agents at agent stations answer many different types of calls including telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase. Handling of the non-voice dialog contact may require a specialized device or subcomponent of the ACD. In this situation, the agent may typically view text on a display screen that the caller typed in or transmitted. In response, the agent may provide information to the contact or request information from the caller, via the keyboard or other input device. Essentially, the dialog between the agent and the caller occurs on a display screen. Further, the agent may handle multiple calls. For example, the agent may typically handle two to five (or more) simultaneous non-voice dialog communications or transactions, which may be presented as two to five separate dialog windows on the display screen, which windows may, for example, be tiled or layered. Of course, the number of simultaneous transactions may vary significantly.

Regardless of whether the incoming call is text-based or voice-based, situations may arise where the agent would need the ability to immediately record the call. For example, criminal activity may occur, such as where a perpetrator calls in a "bomb-threat." It would be desirable if the agent could immediately initiate recording of the incoming call to aid the authorities in apprehending the perpetrator. Alternatively, the agent may wish to record the call to preserve a record of an important transaction, such as a customer complaint or other matter.

Transaction processing systems typically have very limited recording capability. Some transaction processing systems include DAS cards (digital announcement source), which essentially "conference in" the incoming call with a recording circuit. The recording circuit digitizes the speech and saves the recorded conversation on the main hard disk of the transaction processing system. In such known systems, however, the number of simultaneous recordings is very limited. Typically, transaction processing systems cannot record more than four or five simultaneous conversations. Additionally, such systems do not record incoming contacts of a text-based nature. Further, separate recording and announcement circuits are required, thus increasing the cost and complexity of the system.

Further, recording capability in transaction processing systems is very limited with respect to recording time. This is because the recorded speech is stored on the main system hard disk, which is primarily directed to handling system needs. The system hard disk and associated operating systems of known transaction processing systems were not designed to store large amounts of digital recording, i.e., mass recording. Accordingly, such known systems limit the duration of such recordings to a few minutes.

Additionally, specialized processors and/or digital signal processors may be needed to process the recording of the call. Because the call may arrive in a variety of different formats, such as, ISDN, POTS, T1, and the like, and because such formats may be analog or digital in nature, conversion for storage may be relatively expensive and not easily transported from platform to platform. This adds expense and complexity to the transaction processing system.

For businesses where large capacity recording in needed, mass recording systems currently exist for those applications. Such mass recording systems are in widespread use, for example, in brokerage houses and police dispatch centers, such as 9-1-1 dispatch centers, where all incoming calls are recorded on reel-to-reel tape. Such systems, however, record all calls, and typically are connected to the incoming trunk line. As such, it may not possible to have the recording capability selectively turned on or off by the agent on demand, and for individually selectable incoming calls. Such known systems are either turned on globally, or turned off globally with respect to incoming calls, and such recording capability is not selectable by individual agents on demand.

A need exists to permit the agent of a transaction processing system to activate and deactivate system recording capability so that voice-dialog and text-dialog may be recorded.

SUMMARY

The disadvantages of recording and announcement systems for transaction processing systems are substantially overcome by providing a novel system and method for permitting an agent to record an incoming call on demand. More specifically, one embodiment of the system includes a recording system for recording calls between callers and agents of a transaction processing system, and includes an Internet Protocol (IP) gateway, an interface configured to operatively couple the IP gateway to the transaction processing system, a communication network operatively coupled to the IP gateway, where the IP gateway is configured to convert a call received from the transaction processing system into IP protocol data, and provide the IP protocol data to the communication network. Also included is a memory storage system operatively coupled to the processor and configured to store the IP protocol data, a processor operatively coupled to the communication network and configured to receive the IP protocol data, and a switch controlled by the agent and settable between a record-on mode and a record-off mode such that the recording system records the call if the switch is set to the record-on mode and does not record the call if the switch is set to the record-off mode.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
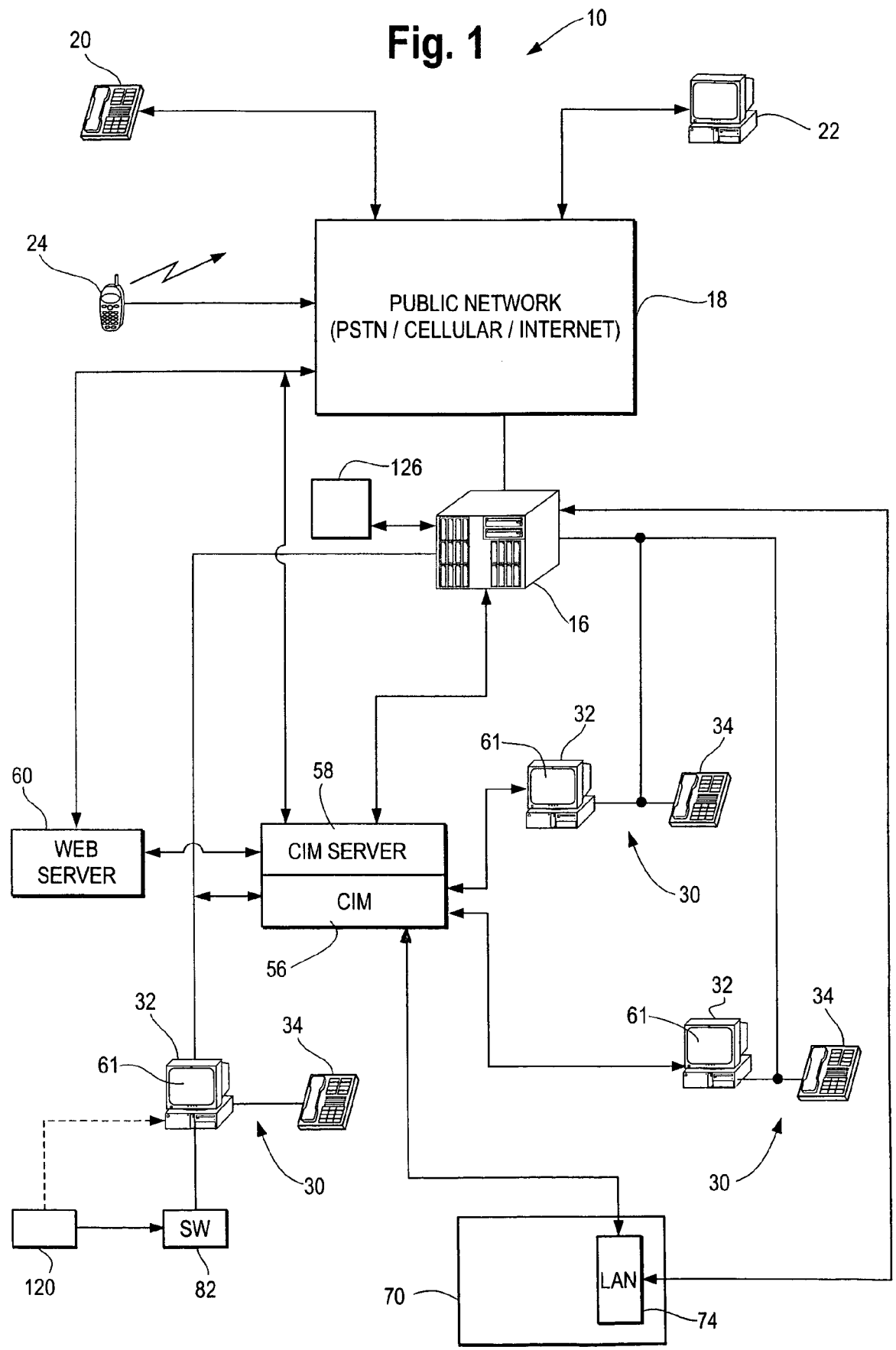
FIG. 1 is a representation of a specific embodiment of a transaction processing system showing an exemplary demand recording and announcement system.

Referring now to FIG. 1, an exemplary embodiment of a system 10 for facilitating routing of incoming calls or contacts ("transactions") to agents associated with a transaction processing system, which may also be referred to as an automatic call distributor or automatic contact distribution system (ACD) 16, is shown generally. The ACD 16 processes both voice-dialog communications or transactions, as well as non-voice dialog communications and transactions, as described hereinafter. The present invention may be implemented in numerous types and sizes of systems for distributing calls to selected ones of a plurality of agents. Examples of ACD systems that may be used in the present invention are the SPECTRUM ACD and Transcend ACD products available from Rockwell FirstPoint Contact.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

A customer or caller may be connected to the ACD 16 through a public switched telephone network (PSTN) 18, which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent or system may have initiated the call to the contact. Accordingly, the term "caller" shall broadly refer to the contact or potential customer even though the agent may have originated or initiated the call or contact. Additionally, the term "call" may be a telephone call, or it may be any other form of communication (e.g. emails etc.) as set forth above.

In the illustrated embodiment, multiple agent stations or terminals 30 are shown coupled to the ACD 16. For purposes of illustration, only three agent stations are shown, but any suitable number of agents may be coupled to the ACD 16. The agent stations 30 may also include agent station computers 32 or terminals, and/or telephone sets 34.

Figure 2:
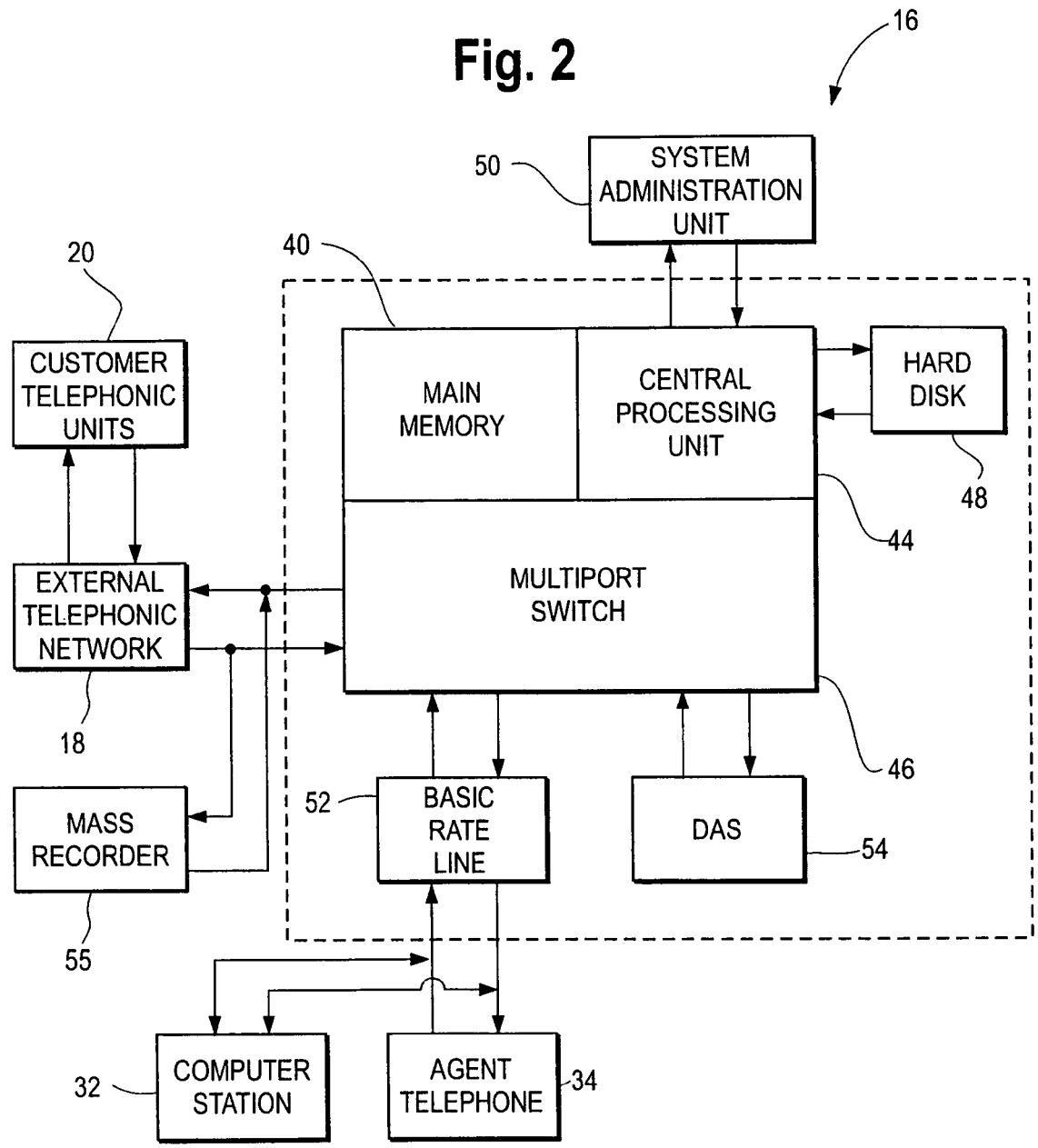
FIG. 2 is a functional block diagram of a specific example of an automatic call distribution system.
Figure 3:
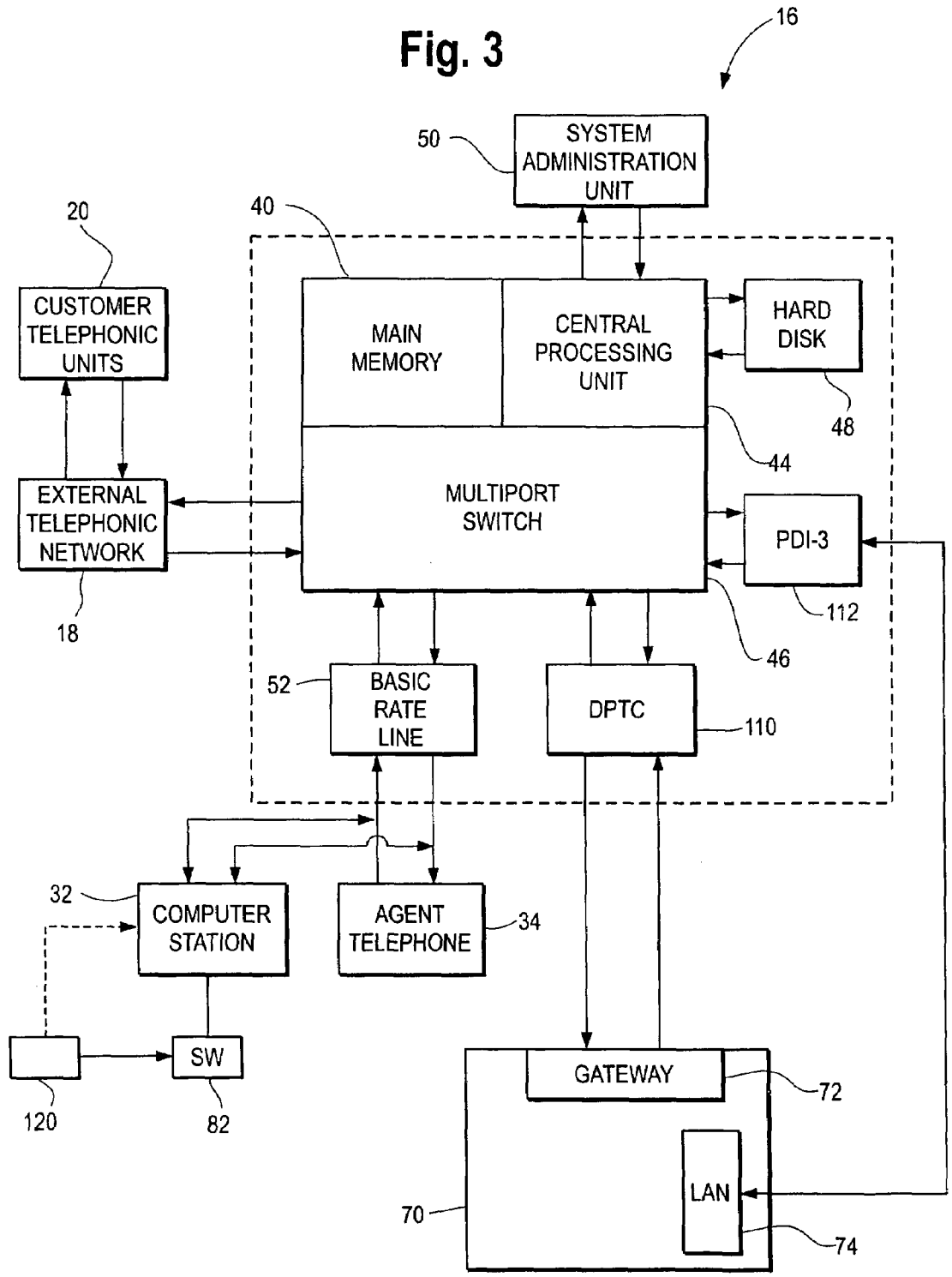
FIG. 3 is a functional block diagram of a specific embodiment the transaction processing system of FIG. 1 shown operatively coupled to a demand recording and announcement system.

Referring now to FIGS. 1 and 2, FIG. 2 shows an example of an ACD 16 in greater detail. The ACD 16 may comprise hardware and/or software and, for example, may include a main memory 40, a central processing unit 44 and a multiport switch 46, each of which may be separate units, distributed components, or integrated at a single location or single cabinet. The multiport switch 46 may be coupled to the PSTN 18, which in turn, may be connected to customer telephones 20 or other communication devices (20, 22, or 24). The central processing unit 44 may include storage, such as hard disk storage 48, and may also be coupled to a system administration unit 50. The ACD 16 is connected through a suitable communication link to the plurality of agent telephonic sets 34, for example, through a basic rate line 52, as is known in the art. The agent computer station 32 and the agent telephone sets 34 may be incorporated into a single unit, as is known in the art.

Additionally, known DAS 54 (digital announcement source) cards may be coupled to the multiport switch 46 to provide limited announcement and recording capability, as is known in the art, and as described above. Note that in some known systems, a mass recording device 55, such as, for example, a reel-to-reel tape recorder, may be coupled to the trunk line, as is known in the art. However, in such known systems, the recording capability is either on or off, for all calls, and the agent cannot select individual calls to record. Further, in known systems, text data is not stored on the a reel-to-reel tape recorder along with the audio recording. Hence, there is no centralized repository in which to store voice and text communication.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell FirstPoint Contact may include a non-voice dialog communication processor, such as a Contact Integration Manager (CIM) 56, which may, for example, be a CIM Release No. 1.1, which is also available from Rockwell FirstPoint Contact. In the specific embodiment shown, the communication processor 56 or CIM (also referred to as non-voice dialog communication processor or communication processor) may handle the non-voice dialog communication between the customer or caller, and the agent.

The communication processor 56 may be operatively coupled to the ACD 16 and to the agent computer 32 or agent stations 30. In the illustrated embodiment of FIG. 1, the communication processor 56 typically receives email, chat room dialog, facsimile, instant message, Internet communication, and the like from a communication processor server 58. The communication processor server 58, in turn, may receive additional non-voice dialog contact communication from a web server 60, which may be connected to the PSTN 18 or some other communication network, as is known in the art. In one specific embodiment, the communication processor 56 may be separate from the ACD 16 and operatively coupled to the ACD 16. Alternatively, the communication processor 56 may be integrated into a portion of the ACD 16 or any other processor or processors in the system. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the apparatus and method described herein, the term ACD 16 is used interchangeably to mean either the ACD and/or the communication processor 56, or a combination of both. Both terms relate to a "transaction processing system" and because the ACD 16 and the communication processor 56 may be so closely related or their functions so distributed that a meaningful distinction may not be able to be made with respect to which particular component is performing a specific action described. Accordingly, for purposes of illustration only, the below-described method will be described in terms of the ACD 16 performing the step or the communication processor 56 performing the step, even though a separate component or subcomponent, such as the other of above-mentioned components, may perform the step or process.

The communication processor 56 in the illustrated embodiment is configured to facilitate sending and receiving non-voice dialog communication between the caller and the agent or agent terminal 30, and to transmit a signal to the ACD 16 indicating that the communication processor received the non-voice dialog communication from the caller. The signal from the communication processor 56 to the ACD 16 creates a "call appearance" so that the ACD is brought into the communication "loop," and is able to track the contact. In one embodiment, the call appearance simulates to the ACD 16 the appearance of a voice-type call, even though a voice-type call is not present. Once the call appearance to the ACD 16 has been made, the ACD can queue and track the non-voice dialog communication to the appropriate agent as if the call were an ordinary interactive voice-dialog call, even though the ACD may not utilize or connect its voice channel to the agent. For example, the communication processor 56 may handle the non-voice dialog communication and provide the call to the agent, and also inform the ACD 16 regarding the status and initiation of the call.

Accordingly, once the call appearance has been made, the ACD 16 in the illustrated embodiment of FIG. 1 selects a particular agent to receive the non-voice dialog communication from the communication processor 56, and then causes the non-voice dialog communication to be routed to the selected agent. The transaction processing system 16 of the illustrated embodiment of FIG. 1 preferably routes voice dialog communication to a selected agent station 30 for servicing by an associated agent using the agent telephone 34 or headset. In conjunction with the communication processor 56, the transaction processing system 16 may, for example, route non-voice dialog or text-based communication to the selected agent station. Again, as set forth above, the communication processor 56 need not be separate or apart from the transaction processing system 16 and may be operatively incorporated into the transaction processing system.

Figure 4:
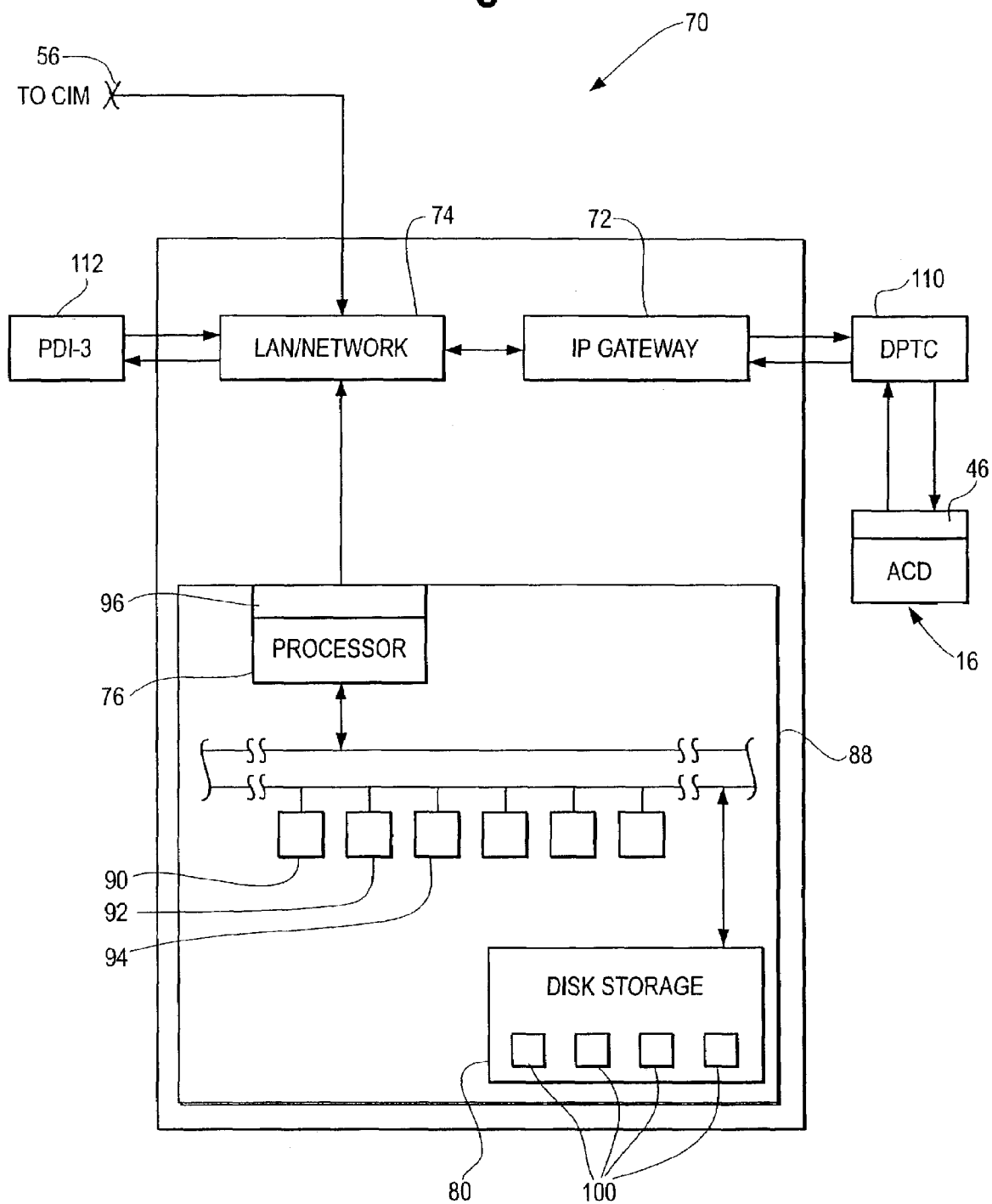
FIG. 4 is a functional block diagram of the demand recording and announcement system of FIG. 3.

Referring now to FIGS. 1-4, FIGS. 1 and 3 show a demand recording and announcement system 70 operatively coupled to the transaction processing system 10, which demand recording and announcement system is shown in greater detail in FIG. 4. Note that the demand recording and announcement system 70 is preferably coupled to the ACD 16, but alternatively may be part of the communication processor 56. Further, the demand recording and announcement system 70 may be separate and apart from the above-mentioned components. It may also be incorporated into a separate enclosure, such as a personal computer. It is immaterial to the scope of this invention where the demand recording and announcement system 70 is physically located.

The demand recording and announcement system 70 illustrated in FIG. 4 includes an IP gateway 72, a communication network 74, a processor 76, hard disk storage 80, and a switch 82. In the example of FIG. 4, the IP gateway 72, communication network 74, processor 76, and hard disk storage 80 may reside in a single enclosure, such as a personal computer. Alternatively, the processor 76 and hard disk storage 80 may be incorporated into a separate processing subsection 88, which may, for example, be another personal computer or equivalent. The processing subsection 88 may, for example, include RAM 90, ROM 92, disk I/O (input/output) 94, communication network interface 96, and the like, as is known in the art. The processor 76 may be any suitable computer, processor, central processing unit (CPU), microprocessor, RISC (reduced instruction set computer), mainframe computer, work station, single chip computer, distributed processor, server, controller, micro-controller, remote computer, and the like. The functions illustrated in FIG. 4 may also be implemented in many other configurations apparent to those skilled in the art.

The hard disk storage 80 may be operatively coupled to the processor 76 and may be configured to store the data that the processor receives from the communication network 74. The hard disk storage 80 or memory storage system may include one or more hard disk drives 100 and associated controllers. Multiple hard disk drives 100 may be used to increase the storage capacity. For example, five 100 Gb disk drives may be used, and redundancy may be incorporated, as is known in the art, but any suitable number of disk drives may be included. The size of the hard disk storage 80, of course, depends upon the size and capacity of the transaction processing system 10 to which it is connected and the number of agents associated therewith. Also, the typical length of calls between agent and contact may be a factor in selecting the storage capacity of the hard disk storage 80. The capacity is preferably selected so that all calls between callers and agents may be recorded simultaneously for the full duration of the call. Suitable known data compression techniques may be used to reduce the amount of data stored on the hard disk.

The communication network 74 may be any suitable communication network, such as, for example, a LAN (local area network). For example, an Ethernet based LAN having a minimum speed of 10 Mb/second to 100 Mb/second may be used. However, any networking medium that supports Internet protocol (TCP/IP) may be used. The communication network 74 may be operatively coupled to the IP gateway 72, as is known in the art.

The IP gateway 72 may, for example, be any suitable gateway, such as a commercially available Cisco brand gateway. The IP gateway 72 converts an incoming call from the transaction processing system 10 into an Internet protocol format (IP format), and provides the IP protocol data to the communication network The incoming call may be in any known format, depending upon the transaction processing system and its connection to the external telephonic network 18. For example, the transaction processing system 10 may provide calls in any of the following formats: Ethernet network protocol, ISDN protocol, USB network protocol, H.323 network protocol, SIP network protocol, MGCP network protocol, VoFR network protocol, VoATM network protocol, TDM network protocol, T1 network protocol, PSTN network protocol, BRI network protocol, POTS network protocol and the like.

The gateway 72 is selected for the particular application so that the specific data format utilized by the transaction processing system 10, such as one of the formats described above, may be converted by the IP gateway into IP protocol. This facilitates retrofitting the transaction processing system 10 or adding the demand recording and announcement system 70 to an existing transaction processing system. Essentially, the gateway 72 converts the call into "packets," as is known in the art, and in accordance with IP protocol. Because the call or data is converted into TCP/IP format, it can be routed to the communication network 74 and stored directly on the hard disk system 80 by the processor 76. Because TCP/IP is such a universally accepted standard, conversion of the call or data representing the call into IP protocol format facilitates use of a large variety of commercially available components, which reduces the cost of the overall system. Accordingly, this may obviate the need for special signal processors, which would be required if the data were not in TCP/IP format.

With respect to "packets," voice data is digitized to a PCM format that may optionally be compressed using a commercially available codec, such as G.729 or G.723.1 and the like. The PCM is then packetized and becomes the "payload portion" of RTP/UDP/IP. As referred to herein, the phrases "IP protocol format," "IP protocol data," or "TCP/IP format" may be referred to interchangeably as "IP packets."

The gateway 72 may be in the form of a card, which may be part of the enclosure or "box" that forms the demand recording and announcement system 70, or it may be incorporated into the processing subsystem or personal computer 88. It is immaterial to the scope of this invention where the communication network 74, gateway 72, processor 76, processing subsystem 88, and disk system 80 reside physically, and may be all incorporated into one enclosure or may be physically located in several enclosures. As mentioned above, each and every call handled by the transaction processing system, that is, any and all calls being handled by an agent, may be recorded in full or in part, at the discretion of the agent, and on demand by the agent. Depending upon the size of the transaction processing system 10, multiple gateway cards 72 may be cascaded or stacked, as is known in the art. For example, typical gateway cards may have twenty-four ports, which correspond to twenty-four simultaneous call. Accordingly, in a transaction processing system able to handle ninety-six calls, for example, four such gateway cards may be used.

The demand recording and announcement system 70 may interface with the transaction processing system 10 or ACD 16 through a digital port termination card (DPTC) 110, which couples each port of the ACD with a corresponding port of the IP gateway 72. Preferably, the DPTC card 110 supports the same number of ports (or simultaneous calls) as the IP gateway 72, and thus, multiple DPTC cards may be used to support maximum capacity. Additionally, to handle transmission of commands between the ACD 16 and the demand recording and announcement system 70, a peripheral data interface card 112 may be used, which may be, for example, a PDI-3 card. The card 112 may be coupled to the communication network 74 of the demand recording and announcement system 70.

As described above, the switch 82 is included, which permits the agent to record his or her conversation on demand, either from the beginning to the end of the dialog, or any number of non-contiguous portions thereof. The switch 82 may be controlled by the agent and may, for example, be settable between a record-on mode and record-off mode. The demand recording and announcement system 70 records the call between the agent and the contact if the switch is set to the record-on mode, and does not record the call if the switch is set to the record-off mode.

The switch 82 may be "toggled" by the agent at any point during the dialog, and as many times at the agent desires, which of course, would result in recording a plurality of non-contiguous portions of the dialog. The switch 82 may be any suitable switch, such as, for example, a hardware switch, keyboard key, software switch, icon on a display screen, pointing device, mouse, voice activation software/hardware, and the like. In one embodiment, the switch 82 may be a hardware switch, such as a momentary contact switch or a toggle switch. In one embodiment, a hardware switch is coupled to the agent computer station 32 rather than directly to the demand recording and announcement system 70 due to wiring concerns and physical location of the demand recording and announcement system.

Accordingly, in one embodiment, if the switch 82 is coupled to the agent computer 32, activation of the switch may send a signal to the ACD 16, which may recognize the signal as indicating that recording on that particular port is to begin. The ACD 16 may then send a command via the PDI-3 card 112 to the communication network 74 of the demand recording and announcement system 70. Once the command is received by the communication network 74, it is passed to the processor 76 for processing. In response to receiving the command, the processor 76 may then direct and control storage of the IP protocol data to the hard disk system 80.

Alternatively, the switch 82 may be a software switch, which may be implemented, for example, in the form of an icon on the agent's display screen 61 or the depression of a key or key sequence on the agent's keyboard, as is known in the art. In either event, activation of the switch 82 is communicated so that the appropriate command is then sent to the demand recording and announcement system 70 for execution. The switch may also be turned on or off from telescripts in the transaction processing system or in an IVR.

Essentially, any switch or mechanism that permits the agent to initiate recording and terminate recording may be used. For example, a speech recognition device 120 may be coupled to the switch 82 (or it may send commands directly to the agent computer) to permit a spoken command from the agent to toggle the switch. For example, the speech recognition device 120 may recognize the command "record" spoken by the agent, and send the appropriate command directly to the agent computer 32 for routing to the ACD 16.

In any of the above embodiments, when the agent activates the switch 82, the agent computer not only transmits an indication of switch activation to the ACD 16, but it may also transmit the port number of the active port so that data on the corresponding gateway port may be recorded (or terminate recordation).

In an alternate embodiment, the communication processor 56 may also be coupled to the communication network 74. This permits text dialog processed by the communication processor 56, which does not travel over an active ACD voice channel, to be recorded as text data. Accordingly, upon receipt of a record command, the ACD 16 may direct the communication processor 56 to send text data representing the text or on-line dialog between the agent and the contact, to the communication network 74, so that it may be recorded on the hard disk system 80.

In this way, voice dialog and/or text dialog (e.g., including VoIP, emails, facsimile, chat room dialog, instant messages, other Internet contacts, etc.) between the agent and the caller or contact, may be recorded on demand by the agent. The entire call may be recorded from beginning to end, or multiple portions thereof may be recorded. In some embodiments, it may be the agent's decision when to record, when to end recording, and what portions are to be recorded. In other embodiments, the system may be programmed to establish some or all of the parameters which determine what is recorded.

In some situations, an agent may wish to record all calls all of the time without specifically issuing a "record" command. Accordingly, an agent profile may reside in the ACD 16 that indicates the agent's desire. Thus, when an agent initially logs into the ACD system 16, his or her profile is inspected, as is known in the art. If the profile indicates that all calls are to be recorded, the ACD will track all of the agent's calls and issue the appropriate commands to the demand recording and announcement system 70 so that each call is automatically recorded in full, without a specific initiation by the agent. Of course, the agent may change his or her profile.

In an alternative embodiment, the demand recording and announcement system 70 may also include "announcement" capability such that various announcements and/or musical selections may be played. Preferably, this may be performed before the caller or contact is connected with the agent. For example, a general announcement thanking the caller for calling the particular business entity may first be played to the caller before the agent is connected. Further, if the agent places the caller on "hold" for some reason, the agent may direct that one of several musical selections be played during the holding period. Each announcement and each musical selection may be stored on the hard disk 80 as a separate file. The various announcement files may be presented to the agent on the agent's display 61 so that selection of one of the files may result in a command being sent to the ACD 16 to cause playback of that file. Accordingly, the ACD 16 may then send the appropriate command to the demand recording and announcement system 70 so that the selected announcement or musical selection is played.

Accordingly, the demand recording and announcement system 70 may handle both recording and announcements in a single system. This obviates the need for separate recording and announcement cards, which are prone to obsolescence.

Specific embodiments of a demand recording and announcement system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A recording system for recording calls between callers and agents of a transaction processing system, the recording system comprising:

an Internet Protocol (IP) gateway;

an interface configured to operatively couple the IP gateway to the transaction processing system;

a communication network operatively coupled to the IP gateway, the IP gateway configured to convert a call received from the transaction processing system into IP protocol data, and provide the IP protocol data to the communication network;

a processor operatively coupled to the communication network and configured to receive the IP protocol data; and a memory storage system operatively coupled to the processor and configured to store the IP protocol data;

a switch controlled by an agent and settable between a record-on mode and a record-off mode wherein the memory storage system records the call if the switch is set to the record-on mode and does not record the call if the switch is set to the record-off mode; and an agent profile having a recording mode preference so that all calls serviced by an agent are automatically recorded if the preference is set to an always-record mode, and are not recorded if the preference is set to a no-record mode.

2. The system according to claim 1 further including a speech recognition device coupled to the switch to permit spoken commands from the agent to toggle the switch.

3. The system according to claim 1 wherein a call in progress is recorded when the agent sets the switch to the record-on mode.

4. The system according to claim 1 wherein a plurality of portions of at least one call are recorded on demand by the agent by selecting between the record-on mode and the record-off mode.

5. The system according to claim 1 wherein the switch is selected from the group consisting of a hardware switch, keyboard key, software switch, icon on a display screen, pointing device, a voice activation device, and mouse.

6. The system according to claim 1 wherein the processor stores the data provided by the communication network in the memory storage system without converting the IP protocol data.

7. The system according to claim 1 wherein the data stored in the memory storage system is compressed.

8. The system according to claim 1 wherein the gateway translates the call from the transaction processing system into a universal format.

9. The system according to claim 8 wherein the gateway translates the call from the transaction procession system into a packet-based protocol.

10. The system according to claim 8 wherein the gateway receives data from the transaction processing system having a protocol selected from the group consisting of Ethernet network protocol, ISDN protocol, USB network protocol, H.323 network protocol, SIP network protocol, MGCP network protocol, VoFR network protocol, VoATM network protocol, TDM network protocol, T1 network protocol, PSTN network protocol, BRI network protocol, and POTS network protocol.

11. The system according to claim 1 wherein the memory storage system contains at least one of a plurality of prerecorded announcements and a plurality of music selections.

12. The system according to claim 1 wherein the communication network is configured to receive text-based data corresponding to an incoming call and provide the text-based data to the processor for storage in the memory storage system.

13. A recording system for selectively recording calls between callers and agents of a transaction processing system, the recording system comprising:
   means for converting a call received from the transaction processing system into IP protocol data;
   an interface configured to operatively couple the means for converting, to the transaction processing system;
   a communication network operatively coupled to the means for converting and configured to receive the IP protocol data from the means for converting;
   means for processing operatively coupled to the communication network and configured to receive the IP protocol data from the communication network;
   means for storing operatively coupled to the processor and configured to store the IP protocol data; and
   means for switching controlled by an agent and settable between a record-on mode and a record-off mode wherein the means for storing records the call if the means for switching is set to the record-on mode and does not record the call if the means for switching is set to the record-off mode and wherein a plurality of portions of at least one call are recorded on demand by an agent by selecting between the record-on mode and the record-off mode.

14. The system according to claim 13 further including an agent profile having a recording mode preference so that all calls serviced by the agent are automatically recorded if the preference is set to an always-record mode, and are not recorded if the preference is set to a no-record mode.

15. The system according to claim 13 wherein the means for switching is selectively turned on or off using telescripts in the transaction processing system.

16. The system according to claim 13 wherein the switch is selected from the group consisting of a hardware switch, keyboard key, software switch, icon on a display screen, pointing device, a voice activation device, and mouse.

17. The system according to claim 13 wherein the data stored in the memory storage system is compressed.

18. The system according to claim 13 wherein the gateway translates the call from the transaction processing system into a universal format.

19. The system according to claim 18 wherein the gateway translates the call from the transaction procession system into a packet-based protocol.

20. The system according to claim 18 wherein the gateway receives data from the transaction processing system having a protocol selected from the group consisting of Ethernet network protocol, ISDN protocol, USB network protocol, H.323 network protocol, SIP network protocol, MGCP network protocol, VoFR network protocol, VoATM network protocol, TDM network protocol, T1 network protocol, PSTN network protocol, BRI network protocol, and POTS network protocol.

21. The system according to claim 13 wherein the memory storage system contains at least one of a plurality of prerecorded announcements and a plurality of music selections.

22. A method for recording calls between callers and agents of a transaction processing system, the method comprising:
   interfacing an Internet Protocol (IP) gateway with the transaction processing system;
   operatively coupling a communication network to the gateway;
   converting, by the gateway, the call received from the transaction processing system into IP protocol data;
   transmitting the IP protocol data to the communication network;
   storing the IP protocol data in a memory storage system; and
   controlling a switch that is settable between a record-on mode and a record-off mode wherein the call is recorded if the switch is set to the record-on mode and the call is not recorded if the switch is set to the record-off mode, and wherein a plurality of portions of at least one call are recorded on demand by an agent by selecting between the record-on mode and the record-off mode.

23. The method according to claim 22 further including an agent profile having a recording mode preference so that all calls serviced by the agent are automatically recorded if the preference is set to an always-record mode, and are not recorded if the preference is set to a no-record mode.

24. The method according to claim 22 wherein a plurality of portions of at least one call are recorded on demand by an agent by selecting between the record-on mode and the record-off mode, respectively.

25. The method wherein the switch is selected from the group consisting of a hardware switch, keyboard key, software switch, icon on a display screen, pointing device, a voice activation device; and mouse.

26. The method according to claim 22 wherein the data stored in the memory storage system is compressed.

27. The method according to claim 22 wherein the gateway translates the call from the transaction processing system into a universal format.

28. The method according to claim 27 wherein the gateway translates the call from the transaction procession system into a packet-based protocol.

29. The method according to claim 27 wherein the gateway receives data from the transaction processing system having a protocol selected from the group consisting of Ethernet network protocol, ISDN protocol, USB network protocol, H.323 network protocol, SIP network protocol, MGCP network protocol, VoFR network protocol, VoATM network protocol, TDM network protocol, T1 network protocol, PSTN network protocol, BRI network protocol, and POTS network protocol.

30. The method according to claim 22 wherein the memory storage system contains at least one of a plurality of prerecorded announcements and a plurality of music selections.

31. The system according to claim 1 wherein the switch is selected turned on or off using telescripts in the transaction processing system.

32. A recording system for recording calls between callers and agents of a transaction processing system, the recording system comprising:
   an Internet Protocol (IP) gateway;
   an interface configured to operatively couple the IP gateway to the transaction processing system;
   a communication network operatively coupled to the IP gateway, the IP gateway configured to convert a call received from the transaction processing system into IP protocol data, and provide the IP protocol data to the communication network;
   a processor operatively coupled to the communication network and configured to receive the IP protocol data;
   a memory storage system operatively coupled to the processor and configured to store the IP protocol data;
   a switch controlled by an agent and settable between a record-on mode and a record-off mode wherein the memory storage system records the call if the switch is set to the record-on mode and does not record the call if the switch is set to the record-off mode; and
   wherein the communications network is configured to receive text-based data corresponding to an incoming call and provide the text-based data to the processor for storage in the memory storage system.

33. A recording system for recording calls between callers and agents of a transaction processing system, the recording system comprising:
   an Internet Protocol (IP) gateway;
   an interface configured to operatively couple the IP gateway to the transaction processing system;
   a communication network operatively coupled to the IP gateway, the IP gateway configured to convert a call received from the transaction processing system into IP protocol data, and provide the IP protocol data to the communication network;
   a processor operatively coupled to the communication network and configured to receive the IP protocol data;
   a memory storage system operatively coupled to the processor and configured to store the IP protocol data;
   a switch controlled by an agent and settable between a record-on mode and a record-off mode wherein the memory storage system records the call if the switch is set to the record-on mode and does not record the call if the switch is set to the record-off mode and wherein the switch is selectively turned on and off using telescripts in the transaction processing system.

* * * * *